United States Patent Office 2,820,084
Patented Jan. 14, 1958

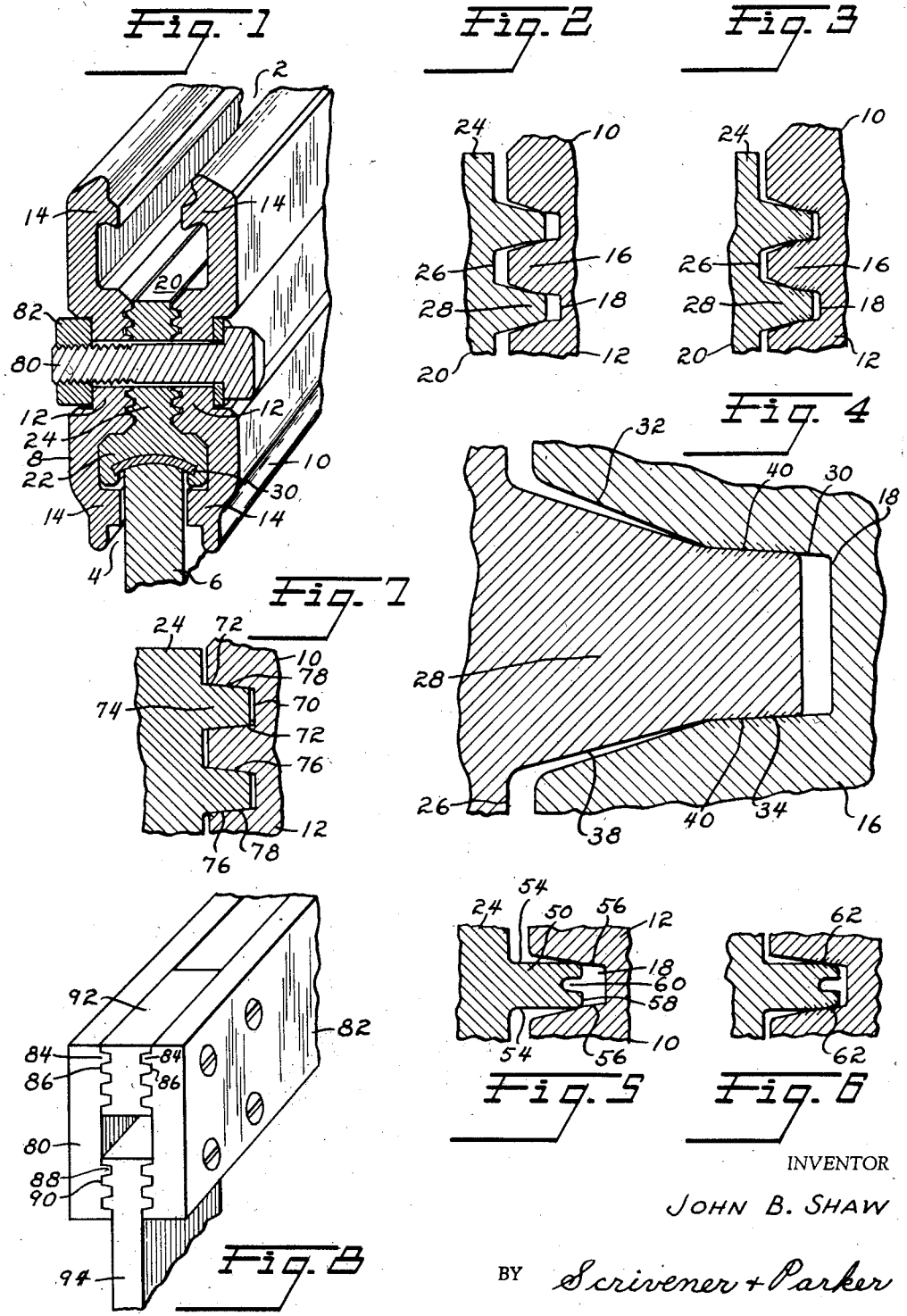

2,820,084
ELECTRICAL CONDUCTIVE DEVICE HAVING FORCE FITTED MEMBERS

John B. Shaw, Redwood City, Calif., assignor to Insul-8-Corp., San Carlos, Calif., a corporation of California Application November 8, 1956, Serial No. 621,127

7 Claims. (Cl. 174—94)

This invention relates broadly to the field of transmission of electricity through contact bars, bus-bars and the like and, more particularly, provides such a device of new and improved construction which utilizes parts formed of aluminum, a metal of high electrical conductivity, which parts are joined together in a new and improved manner to provide maximum conductivity between them. While the invention is described in this application as applied to contact bars and bus-bars, it will be apparent that it is not limited to such devices but is useful in all electrical devices in which high electrical conductivity between separate but connected parts is of importance. Further, while the invention is described in this application in connection with the joining of aluminum parts to provide maximum electrical conductivity it will be apparent that it will be useful in joining parts formed of other metals, including those which have the same characteristic as aluminum of forming an external oxide skin in the presence of air.

It is well known that aluminum has many advantages as a material for use as the conductive element of an electrical system, these advantages including, among others, high electrical conductivity, lightness in weight and ease of fabrication. One disadvantage of aluminum as a material for electrical conductors, however, is the fact, which is also well known, that it forms an external oxide skin in the presence of air and that this oxide is not a good conductor of electricity, thus reducing the overall conductivity of an aluminum conductor, particularly at the coupling points when formed of separate but connected parts. A principal object of this invention has therefore been to provide a composite electrical conductor, such as a contact bar or a bus-bar, formed of a number of separate parts which are so constructed and connected together that the oxide skin is broken up or destroyed in connecting the parts, thus bringing the aluminum metal of the separate parts into contact and thereby securing all of the advantages of aluminum as a conductor while, at the same time, eliminating the disadvantageous effects of the oxide skin.

The invention and its advantages and results are described in more detail in the following specification and certain embodiments are illustrated in the accompanying drawings, in which:

Fig. 1 is a partly sectional and partly perspective view of a contact bar for an electrical distribution system, illustrating and embodying the invention;

Fig. 2 is an enlarged view of parts of certain of the elements of the contact bar of Fig. 1, showing particularly the interfitting connection of the ridges and grooves of two of the elements before the parts are finally forced together;

Fig. 3 is a view which is similar to Fig. 2 but shows the parts after they are forced together;

Fig. 4 is a greatly enlarged view of parts shown in Fig. 3;

Fig. 5 is a view which is similar to Fig. 3 but shows a modified form of the invention;

Fig. 6 is a view of the parts shown in Fig. 5 after being forced together;

Fig. 7 is a view which is similar to Fig. 3 but shows a further modification of the invention, and Fig. 8 is a partly sectional and partly perspective view showing a flat bus bar having parts constructed and connected in accordance with the invention.

In Fig. 1 of the drawings there is disclosed a contact bar formed of a number of separate parts which are constructed and connected together in a new and useful manner provided by this invention by reason of which maximum electrical contact between the parts is provided. In its final form in which the parts are connected together this contact bar is an elongated composite structure which is generally H-shaped in cross-section having open opposite edges 2, 4 through one of which an electrical collecting device 6, which may be a trolly contact or shoe, is adapted to extend into electrical contact with one of the members of the contact bar. The composite contact bar comprises two facing side members of identical cross-sectional shape which are indicated at 8, 10. Each of these parts is a preferably extruded aluminum shape which is generally flat in cross-section and has a central part 12 which extends inwardly of the contact bar, i. e. toward the other side member, when the parts are assembled. At the upper and lower edges of each of the parts 8, 10 there is an inwardly-extending flange 14 and when the contact bar parts are assembled these flanges are spaced apart to define the opening through which the collector device 6 extends. An elongated aluminum bar 20, which is T-shaped in cross-section having the head 22 and the web 24, is disposed between the side parts with its web 24 in contact with the two central parts 12 of the side members 8, 10. The outer surface of the head part 22 of this central spacing member 20 is provided with a concave, arcuate groove extending substantially entirely across the head and within which an elongated concave contact member 30 is attached by any suitable means such as brazing. This contact member 30 may be formed of copper or other material having reasonably high electrical transfer conductivity and provides a surface which is engaged by the collector 6 as the collector moves along the contact bar.

Means are provided by the invention for connecting the two side parts 8, 10 to the central, T-shaped part 20 to provide high electrical transfer conductivity between these parts. A preferred form of such means is shown in enlarged detail in Figs. 2, 3 and 4 and comprises a series of parallel, alternating ridges 16 and grooves 18 formed on the inwardly-facing surfaces of the parts 12 of the side members 8, 10 and extending longitudinally along the length of each of these members, and a corresponding series of parallel, alternating grooves 26 and ridges 28 formed on the opposite side walls of the web 24 of the T-shaped central member 20. The ridges formed on each of these parts are adapted to be received in the grooves formed in the adjacent face of another of the parts, whereby the ridges and grooves of the three parts are made to interfit as shown in Figs. 2, 3 and 4.

The grooves formed in one of the parts, such as one of the side members 8, 10 and the ridges formed in the adjacent, attached part, such as the web 24 of member 20, are so shaped that when the parts are forced together a very tight connection is provided which affords maximum electrical transfer conductivity. In this preferred form of the invention the side walls defining the bottom or inner part of each groove diverge outwardly at a very small angle which is preferably less than 10° as shown at 30 and, in all cases, is of the order of angles of this size. The walls diverge at a much greater angle to their outer edges as shown at 32, thus having at least two surface angularly related to each other. Such grooves, having two or more angularly related surfaces forming their side walls, are hereinafter referred to as having compound angular side walls. The ridges 28 on web 24 which are adapted to be received within the grooves 18 also have compound angular side walls. As shown most clearly in Fig. 4 the entering or outer part of each ridge has side walls 34 which converge outwardly of the ridge at a small angle which is preferably 10° or less and which, in all cases, is of the order of angles of this size. From this entering part of each ridge the side walls thereof diverge toward the base of the ridge at a much greater angle, as shown at 38, which corresponds to the angular relation between the outer parts 32 of the side walls of the grooves 18. When the two parts are initially brought together with the ridges 28 in the grooves 18, as shown in Fig. 2, the outer end parts of the ridges will not go to the bottoms of the corresponding grooves because of the angular relations of the side walls of the ridges and grooves and the parts must be forced together to cause the grooves and ridges to interfit completely. When this is done the side walls of the outer part of each ridge come into tight rubbing contact with the adjacent side walls of the bottom of the groove in which the ridge is received, and when this occurs the walls of the interfitting ridges and grooves will grind over each other causing a galling action to occur which will break up any oxide film which may exist on these walls and thus produce a metal-to-metal contact between the adjacent walls of the ridges and grooves. The surfaces over which this galling action occurs are indicated at 40 in Fig. 4.

A second form which the invention may take is disclosed in Figs. 5 and 6. In this embodiment the grooves 18 are formed in the same manner as those illustrated in Figs. 2, 3 and 4 and described hereinbefore, and therefore have compound angular side walls. The ridges 50 which are formed on the adjacent member, such as web 24, have substantially parallel side walls 54 which are spaced apart by a distance slightly greater than the spacing between the side walls 56 which form the bottom part of groove 50. The outer or entering face 58 of the ridge is formed with a groove 60 of substantial depth which extends longitudinally of the ridge preferably midway between the side walls 54. When the parts 24 and 10 are brought together with the ridges 50 received within the grooves 18 the ridges will not pass completely into the grooves but will be held in the position shown in Fig. 5 by reason of engagement of the outer ends of the side walls 54 of the ridge with the side walls defining the bottom part 56 of the groove. When the two parts are forced together the outer parts 58 of the ridge, on either side of the slot 60, will be forced toward each other sufficiently to permit the ridge to move completely into the groove with a very tight fit between the side walls of the ridge and those of the groove. The slot 60 will permit the end parts of the ridge to move toward each other with a certain amount of resilience. As the ridge moves into the groove the walls of these interfitting parts will grind over each other causing a galling action to take place which will break up any oxide film which may exist on these walls and thus produce a metal-to-metal contact between the adjacent walls of the ridges and grooves. The surfaces over which this galling action occurs are indicated at 62 in Fig. 6.

Another form which the invention may take is disclosed in Fig. 7, in which the parts are shown after having been forced together to their final, connected positions. In this embodiment each groove 70 is defined by flat side walls 72 which converge toward the bottom of the groove at a very small angle which is preferably less than 10° and, in all cases, is of the order of angles of this size. Each ridge 74 is also defined by flat side walls 76 which converge toward the outer end surface of the ridge by a very small angle which is preferably less than 10° and, in all cases, is of the order of angles of this size. When the flat-sided ridges 74 are forced into the flat-sided grooves 70 the walls of the interfitting ridges and grooves will grind over each other just before and until the end of their relative movement, causing a galling action to take place which will break up any oxide film which may exist on these walls and thus produce a metal-to-metal contact between the adjacent walls of the ridges and grooves. The surfaces over which this galling action takes place are indicated at 78 in Fig. 7.

At intervals along the length of the component parts of the contact bar openings are provided which are aligned with each other and through which bolts 80 are extended, each of which receives a nut 82 which may be drawn up on the bolt to draw and clamp the parts together. In the actual manufacture of a contact bar of the described construction the galling action may be accomplished by turning up the nuts 82 on their bolts, or by passing the composite structure formed of parts 8, 10 and 20 through a set of rolls, or otherwise, thus forcing the component parts of the contact bar into the tight engagement described hereinbefore and which is important in order to accomplish the interconnection of the ridges and grooves and the consequent galling action.

When a contact bar having the described construction is utilized in an electrical collection system a source of electrical energy (not shown) is connected to one or both of the side members 8, 10 of the contact bar and the electrical energy of the source will be transmitted to the central T-shaped member substantially without loss due to the intimate connection of the side members with the web of the T-shaped central member which is achieved by the galling action which takes place when the ridges and grooves of the three parts of the contact bar are forced into inter-engagement with each other. The electrical energy in the T-shaped member will be transmitted to the collector 6 through the intermediary of the contact piece 30, if this piece is used.

The invention is useful in the construction of other devices for transmitting electricity as well as in the construction of contact bars for electrical collection systems. For example, it may be used in the construction of bus-bars when it is desired to take advantage of the many advantageous features of aluminum construction. A bus-bar formed in accordance with the invention is disclosed in Fig. 8 and comprises the side pieces 80, 82 which are generally flat in cross section and which are provided adjacent their one longitudinal edge with a plurality of alternate ridges 84 and grooves 86 and, adjacent their other longitudinal edges, are provided with other longitudinally extending ridges 88 and grooves 90. The ridges and grooves 84, 86 adjacent the one edge are adapted to be forced into tight inter-engagement with grooves and ridges formed on the opposite side faces of an aluminum bar 92. The ridges 88 and grooves 90 adjacent the other longitudinal edges of the side pieces 80, 82 are also adapted to be forced into tight engagement with grooves and ridges which are formed on the opposite faces of a tap or take-off member 94. All of these ridges and grooves are formed in the manner described hereinbefore and when the parts of the bus-bar disclosed in Fig. 8 are forced together the described galling action takes place, breaking up or destroying the oxide film on the surface of the ridges and grooves and thus permitting the aluminum metal of the parts to come into close electrical contacting engagement without the interposition of oxide film, thus establishing maximum electrical conductivity between the parts.

By the present invention I have provided a composite structure for transmitting or conducting electrical energy which has great strength and rigidity and which may be formed from a minimum number of parts. All of these parts may be formed of aluminum or other metal which forms an oxide coating and are of such shape and construction that they may be easily extruded, thus reducing the cost of fabrication. By reason of the fact that they are formed of aluminum and are so constructed and connected that the oxide skin of the aluminum parts is broken up or destroyed in the connection of the parts, maximum electrical conductivity between the parts is accomplished.

While the invention has been particularly described herein in connection with conducting devices formed of aluminum, and while the invention is particularly useful in providing a composite conducting device made in whole or in part of aluminum or other metal having the characteristic of forming an exterior oxide skin in the presence of air, the invention is also of utility in the fabrication of a composite electrical conducting device made of parts which are formed of other metals than aluminum or formed of different metals, but in which it is desired to have the greatest possible electrical conductivity between the parts.

While I have described and illustrated certain embodiments of my invention, it will be apparent to those skilled in the art that other embodiments, as well as modifications of those disclosed, may be made and practiced without departing in any way from the spirit or scope of the invention, for the limits of which reference must be had to the appended claims.

What is claimed is:

1. A device for transmitting electrical energy comprising two elongated side members having substantially identical cross-sectional shape, each of said members having a plurality of alternate grooves and ridges extending longitudinally thereof and formed on the side thereof facing the other member, an intermediate elongated member disposed between the two side members and having alternate ridges and grooves formed on its side faces adapted and arranged to interfit with the grooves and ridges of the side members, the walls defining each groove being so shaped and angularly disposed to each other and to the walls of the ridge received within it that when the side and intermediate members are forced toward each other to cause the ridges to be fully received within the grooves a galling action takes place between the contacting walls of the grooves and ridges.

2. A device for transmitting electrical energy according to claim 1, in which each side member comprises an elongated part of generally flat cross-sectional shape having a central part offset and extending toward the other side member and in and on which the grooves and ridges are formed.

3. A device for transmitting electrical energy according to claim 1, in which each side member comprises an elongated part of generally flat cross-sectional shape having a central part offset and extending toward the other side member and in and on which the grooves and ridges are formed and having a central part offset and extending toward the other side member and in and on which the grooves and ridges are formed.

4. A device for transmitting electrical energy according to claim 1, in which each side member comprises an elongated part of generally flat cross-sectional shape having a central part offset and extending toward the other side member and in and on which the grooves and ridges are formed and having a flange adjacent each longitudinal edge thereof extending toward the other side member.

5. A device for conducting electrical energy which is generally H-shaped in cross-section and which comprises two separate, spaced, elongated side members of generally flat cross-sectional shape each of which is provided at and adjacent the median part of the side thereof facing the other side member with alternate ridges and grooves extending longitudinally thereof, an elongated intermediate member of T-shaped cross-section having a head part and a web part having alternate ridges and grooves formed on its opposite faces which are interfitted with the grooves and ridges of the side members sufficiently tightly to cause a galling action to take place between the walls of the grooves and ridges of the side members and the intermediate member when the three members are forced together.

6. A device according to claim 5, in which the outer surface of the head part of the intermediate member is formed with a concave groove extending longitudinally of said member, and a strip of metal of high electrical conductivity is disposed in said groove and has arcuate cross-sectional shape and is connected to the intermediate member.

7. A low-resistance metallic structure consisting of at least two separate connected members, at least one groove formed in one member and at least one ridge formed on the other member and disposed within said groove, the walls of the groove at and adjacent the bottom of the groove being convergent toward the bottom of the groove at a relatively small angle and the remainder of the walls of the groove being divergent toward the opening of the groove at a larger angle than the angle of convergence of the walls adjacent the bottom of the groove, and the walls of the ridge at and adjacent the outer end of the ridge being convergent toward the outer end of the ridge at a relatively small angle approximately equal to the angle of convergence of the walls of the groove at and adjacent the bottom thereof and the remainder of the walls of the ridge being divergent toward the base of the ridge at a larger angle approximately equal to the angle of divergence of the walls defining the outer part of the groove, whereby the two members must be forced toward each other to cause the ridge to be fully received within the groove.

References Cited in the file of this patent
UNITED STATES PATENTS

| 1,468,187 | Werbeck | Sept. 18, 1923 |
| 2,778,868 | Stinger | Jan. 22, 1957 |